United States Patent
Shestak

(10) Patent No.: US 8,462,385 B2
(45) Date of Patent: Jun. 11, 2013

(54) COLOR MATCHING FOR COLOR MANAGEMENT SYSTEMS

(75) Inventor: Vladimir V. Shestak, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1048 days.

(21) Appl. No.: 12/467,526

(22) Filed: May 18, 2009

(65) Prior Publication Data
US 2010/0290065 A1  Nov. 18, 2010

(51) Int. Cl.
  *H04N 1/60*  (2006.01)
  *G06K 9/00*  (2006.01)

(52) U.S. Cl.
  USPC .............................. 358/1.9; 358/518; 358/1.2

(58) Field of Classification Search
  USPC ............ 358/1.2, 1.9, 1.14, 1.15, 518; 399/79, 399/82
  See application file for complete search history.

(56) References Cited

U.S. PATENT DOCUMENTS

| | | | | |
|---|---|---|---|---|
| 5,615,312 A | * | 3/1997 | Kohler | 358/1.9 |
| 5,825,986 A | * | 10/1998 | Ferguson | 358/1.9 |
| 7,280,258 B2 | | 10/2007 | Kitahara et al. | |
| 7,636,176 B2 | * | 12/2009 | Mikami | 358/1.9 |
| 7,701,625 B2 | * | 4/2010 | Woolfe et al. | 358/518 |
| 7,755,796 B1 | * | 7/2010 | Phillips et al. | 358/1.9 |
| 7,961,321 B2 | * | 6/2011 | Bonikowski et al. | 356/402 |
| 8,040,557 B2 | * | 10/2011 | Shibaki et al. | 358/1.9 |
| 8,102,565 B2 | * | 1/2012 | Fan et al. | 358/1.9 |
| 2002/0089686 A1 | * | 7/2002 | Kitahara et al. | 358/1.14 |
| 2003/0043392 A1 | * | 3/2003 | Sugimoto | 358/1.9 |
| 2003/0047099 A1 | * | 3/2003 | Hanyu | 101/484 |
| 2004/0114163 A1 | | 6/2004 | Alderliefste | |
| 2004/0135791 A1 | * | 7/2004 | Krueger et al. | 345/589 |
| 2004/0227964 A1 | * | 11/2004 | Fujino | 358/1.9 |
| 2006/0170993 A1 | | 8/2006 | Jacob | |
| 2007/0003306 A1 | * | 1/2007 | Jacobsen et al. | 399/79 |
| 2007/0076260 A1 | | 4/2007 | Upton | |
| 2007/0097464 A1 | * | 5/2007 | Nielsen et al. | 358/518 |
| 2007/0297667 A1 | | 12/2007 | Umezawa | |
| 2008/0204774 A1 | | 8/2008 | Matsushima | |
| 2008/0204830 A1 | | 8/2008 | Tanaka | |
| 2009/0073462 A1 | * | 3/2009 | Yamauchi | 358/1.2 |
| 2009/0109454 A1 | * | 4/2009 | Nagarajan et al. | 358/1.9 |
| 2010/0045987 A1 | * | 2/2010 | Bonikowski et al. | 356/402 |
| 2010/0157393 A1 | * | 6/2010 | Qiao | 358/500 |
| 2012/0105880 A1 | * | 5/2012 | Harada | 358/1.9 |

OTHER PUBLICATIONS

Arvind et al, "Automatic Text Box Separation in Document Images," Oct. 2006, pp. 53-58, Fourth International Conference on Intelligent Sensing and Information Processing.

* cited by examiner

*Primary Examiner* — Kimberly A Williams
(74) *Attorney, Agent, or Firm* — Duft Bornsen & Fettig, LLP

(57) ABSTRACT

Embodiments herein provide for color conversion in production printing systems. The color conversion system includes a processor operable to receive a print job and convert the print job into a full sheetside bitmap comprised of an array of color pixels. The full sheetside bitmap is destined for color conversion via an ink limitation algorithm. The color conversion system also includes an image identification module operable to identify a portion of the print job for a level of color accuracy and to designate that portion of the print job for color conversion via a color accuracy algorithm. The processor is operable to convert a color value of the identified portion of the print job using the color accuracy algorithm. The processor also converts color values of the remainder of the print job using the ink limitation algorithm.

10 Claims, 5 Drawing Sheets

COLOR MATCHING FOR COLOR MANAGEMENT SYSTEMS

BACKGROUND

1. Field of the Invention

The invention relates to the field of color conversion of image data, and in particular, to printing systems and methods for converting colors via color management processing.

2. Statement of the Problem

In color printing, displaying, and reproduction, the term gamut represents the set of colors that a color-reproduction device is physically able to generate. Every device that displays or reproduces an image, such as a printer, monitor, scanner, or digital camera, may have its own unique color gamut. When an image is transferred from one device to another, the color gamut of each device is examined to closely match the color in the transferred image. That is, an attempt is made to closely match the color gamut of the image originating device and the device to which the image is being transferred so as to provide the most aesthetically pleasing color conversion. For example, the color gamut of a digital camera is generally greater than the color gamut of a printer. When color values of the digital camera color gamut are mapped to the color gamut of the printer, the conversion process generally requires intense analysis to ensure that the print quality is sufficient.

A competing interest in color printing, however, regards the costs associated with toner and ink. While a certain amount of toner or ink is necessary for maintaining relatively high quality printing, toner/ink typically accounts for a substantial portion of the printing expenses. Traditionally, toner/ink has been conserved via a color management algorithm such as under color removal (UCR). In C, M, Y, K (Cyan, Magenta, Yellow, and Black) color printing, UCR eliminates certain amounts of cyan, magenta, and yellow that add to dark neutral colors, such as black. These colors are then replaced with the less expensive black ink/toner during the color separation process.

Many existing color management algorithms provide a relatively high quality color conversion; however, certain instances may occur where the colors are not as accurate as may be desired. For example, a print job may include image data having a very customer specific color, such as the famous "John Deere Green". Accordingly, when a customer prints to a tangible medium (e.g., paper), that customer typically demands that the color be represented as accurately as possible within the color gamut of the printer. However, there is presently no manner available to reduce ink/toner without similarly degrading the customer specific color. Moreover, if the printer were to use its full gamut to improve the quality of the customer specific color when printing the print job in its entirety, the ink may be applied to heavily causing "bleed through" where the ink saturates the paper. Thus, there is a need for improved means for limiting ink/toner so as to reduce the costs of printing and/or bleed through without sacrificing print quality in customer specific colors.

SUMMARY

Embodiments of the invention solve the above and other related problems with methods and associated systems by providing color conversion for use in color management/ink limiting systems of production printers. One color conversion system described below includes a processor that is operable to receive a print job and convert the print job into a full sheetside bitmap comprised of an array of color pixels. The full sheetside bitmap is destined for color conversion via an ink limitation algorithm. The color conversion system also includes an image identification module that is operable to identify a portion of the print job for a level of color accuracy and to designate that portion of the print job for color conversion via a color accuracy algorithm. The processor is operable to convert a color value of the identified portion of the print job using the color accuracy algorithm. The processor is also operable to convert color values of the remainder of the print job using the ink limitation algorithm.

The color accuracy algorithm may be a color difference algorithm. For example, the processor may be operable to receive an input color value and process the color difference algorithm to compute a difference between the input color value and the color value of the identified portion of the print job. The input color value may be a Lab color value, the color value of the print job may be a CMYK color value, and the color difference algorithm may be a genetic algorithm.

The processor may be further operable to generate alternate color values for the identified portion of the print job based on the computed difference. In this regard, the processor may be further operable to rank the alternate color values and remove at least one alternate color value that does not substantially match the input color value based on the rank. The processor may be further operable to repeat generation of the alternate color values for the identified portion of the print job, to rank the alternate color values of the identified portion of the print job, and to remove alternate color values that do not substantially match the input color value until at least one of the alternate color values substantially matches the input color value.

In another embodiment, a method of color converting image data for printing includes receiving the image data, identifying a portion of the image data to be processed via a color accuracy algorithm, and processing the identified portion of the image data via the color accuracy algorithm to convert a color value of the identified portion of the image data to a color gamut of the printer. The method further includes processing the remaining image data with an ink limitation algorithm to convert the color values of the remaining image data to the color gamut of the printer and limit ink applied to a tangible medium during printing.

In another embodiment, a software program is used in color conversion. In the software program includes instructions that are configured to direct a processor to receive image data, to identify a portion of the image data to be processed via a color accuracy algorithm, and to process the identified portion of the image data via the color accuracy algorithm to convert a color value of the identified portion of the image data to a color gamut of the printer. The instructions also direct the processor to process the remaining image data with an ink limitation algorithm to convert the color values of the remaining image data to the color gamut of the printer and limit ink applied to a tangible medium during printing.

In another embodiment, a color conversion system includes a processor operable to receive image data and to convert color values of the image data from a first color gamut to a second color gamut. The color conversion system also includes a storage element comprising a first set of color conversion instructions operable to direct the processor to limit colors of the second color gamut during color conversion of the image data. The storage element further comprises a second set of color conversion instructions operable to direct the processor to provide an additional level of color conversion accuracy during color conversion of the image data. The color conversion system also includes an image identification module operable to identify a portion of the image data for processing via the second set of color conversion instructions. The processor is operable to convert a color value of the identified portion of the image data using the second set of color conversion instructions and to convert color values of the remainder of the image data using the first set of color conversion instructions.

The invention may include other exemplary embodiments described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below, but by the claims and their equivalents.

Figure 1:
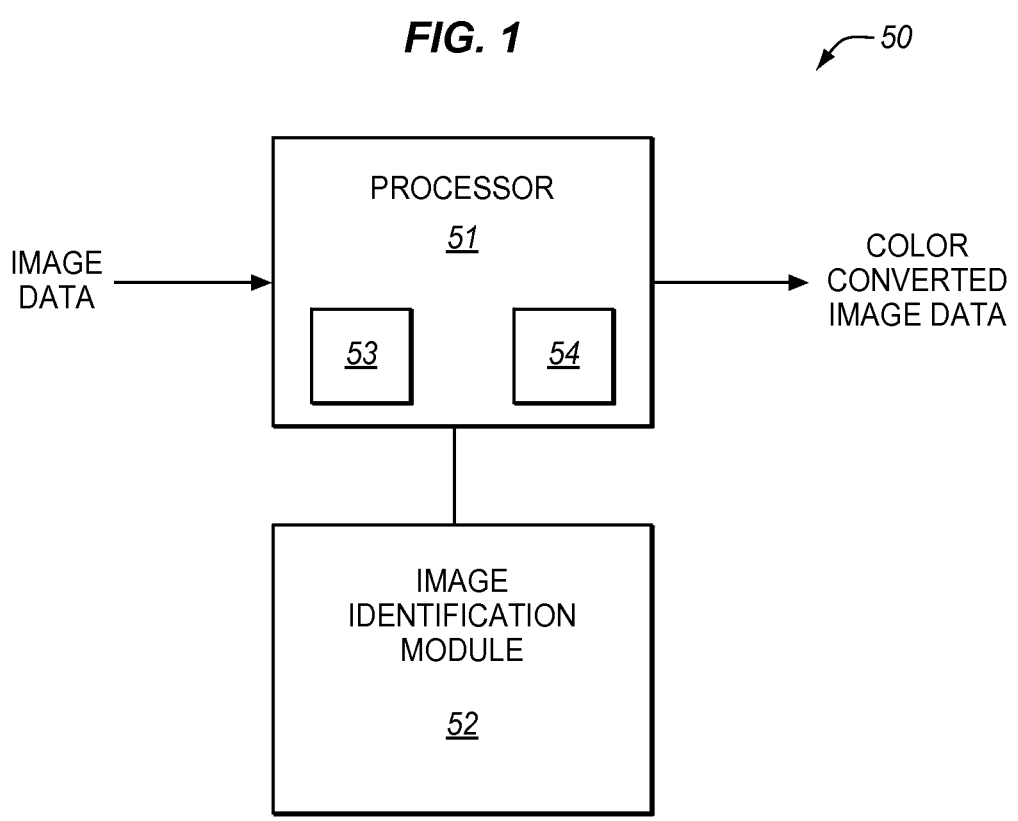
FIG. 1 is a block diagram illustrating a color conversion system in an exemplary embodiment.

FIG. 1 is a block diagram of a color conversion system 50 that is operable to receive image data comprising color pixels. These color pixels have color values within the color gamut of the image originating device. The color conversion system 50 converts the image data to color values in an output color gamut. For example, the image data may include color pixels generated by a digital camera. The color conversion system 50 may receive those color pixels and convert the color values thereof to a smaller color gamut of a printer where the converted image data is to be printed onto a tangible medium.

The color conversion system 50 includes a processor 51 that is operable to receive the image data and to convert the image data to the output color gamut. In doing so, the processor 51 may operate on the image data using a color conversion algorithm that translates color values of the input color gamut to color values of the output color gamut. For whatever reason (e.g., customer satisfaction, trademark enforceability, etc.), the input image data may include a portion that uses a certain level of accuracy during the color conversion process. For example, the image data may include a logo or a trademark within a larger image. That logo or trademark may use a very accurate translation from the input color gamut to the output color gamut.

One example of such includes the well-known John Deere Green mentioned above. When the Deere Company prints advertising (e.g., the John Deere logo having a green background and a gold deer) with a production printing system, the production printing system may impose an ink saving, or ink limitation, algorithm 53 that prepares the color values of the print job (i.e., the advertising) for reduced ink printing. As mentioned, the ink limitation process may be advantageous as a cost saving mechanism and/or by preventing ink saturation with a tangible medium. However, this ink limitation color conversion may not accurately represent the colors of the John Deere logo as desired. The color conversion system 50, therefore, processes a portion of the image data with a color accuracy algorithm 54 that allows the desired portion of the image data to be more accurately represented (e.g., the John Deere logo). However, the remainder of the image data may still be processed with the ink limitation algorithm 53 thereby providing the ink saving advantages just described. In this regard, the color conversion system 50 may include an image identification module 52 that is used to identify a portion of the image data for an additional level of color conversion accuracy. The image identification module 52 may then designate that portion of the print job for color conversion via a color accuracy algorithm 54. Once designated, the processor 51 converts the color values of the identified portion of the image data using the color accuracy algorithm 54 and converts the color values of the remaining portion of the image data using the ink limitation algorithm 53.

The color accuracy algorithm 54 may be a color difference algorithm implemented as software instructions that direct the processor 51 to receive an input color value and compute a difference between the input color value and color values of the identified portion of the print job. In one embodiment, the input color value is a Lab color value, the color values of the identified portion of the image data are CMYK color values, and the color difference algorithm is a genetic algorithm. Generally, a genetic algorithm is a search technique used in computing to find exact or approximate solutions to optimization and search problems. Typically, a genetic algorithm has a genetic representation of a solution domain and a fitness function to evaluate the solution domain. The fitness function is defined over the genetic representation and measures the quality of the represented solution. Once the genetic representation and the fitness function are defined, the genetic algorithm initializes a population of random solutions and improves the solutions through repetitive application of mutation, crossover, inversion and selection operators.

For example, a population of abstract representations of candidate solutions to an optimization problem directs the processor 51 to evolve toward improved solutions. This evolution typically starts from a population of randomly generated individuals iteratively occurring in multiple generations. In each generation, the fitness of each individual in the population is evaluated. Multiple individuals are then stochastically selected from the current population based on their fitness, and modified (e.g., recombined and possibly randomly mutated) to form a new population. The new population is then used in the next iteration of the algorithm 54. The algorithm 54 is typically configured to terminate when either a maximum number of generations has been produced or a satisfactory fitness level has been reached for the population.

In processing the color accuracy algorithm 54, the processor 51 may rank the color values of the identified portion of the image data and compute alternate color values for the identified portion based on the rank of the color values. For example, the processor 51 may generate a plurality of color values when computing the alternate color values, analyze the color values, and remove at least one color value that does not substantially match the input color value. That is, the processor 51 may iteratively compute color values and determine differences between the color values and the input color value. The color value(s) that the processor 51 deems to not accurately represent the desired color value is then removed. New color values are then generated from the remaining set and each color value is again compared to the input color value. This process may continue until a particular set of color values most closely approximates the input color value and/or when subsequent color value generations yield negligible improvements.

Figure 2:
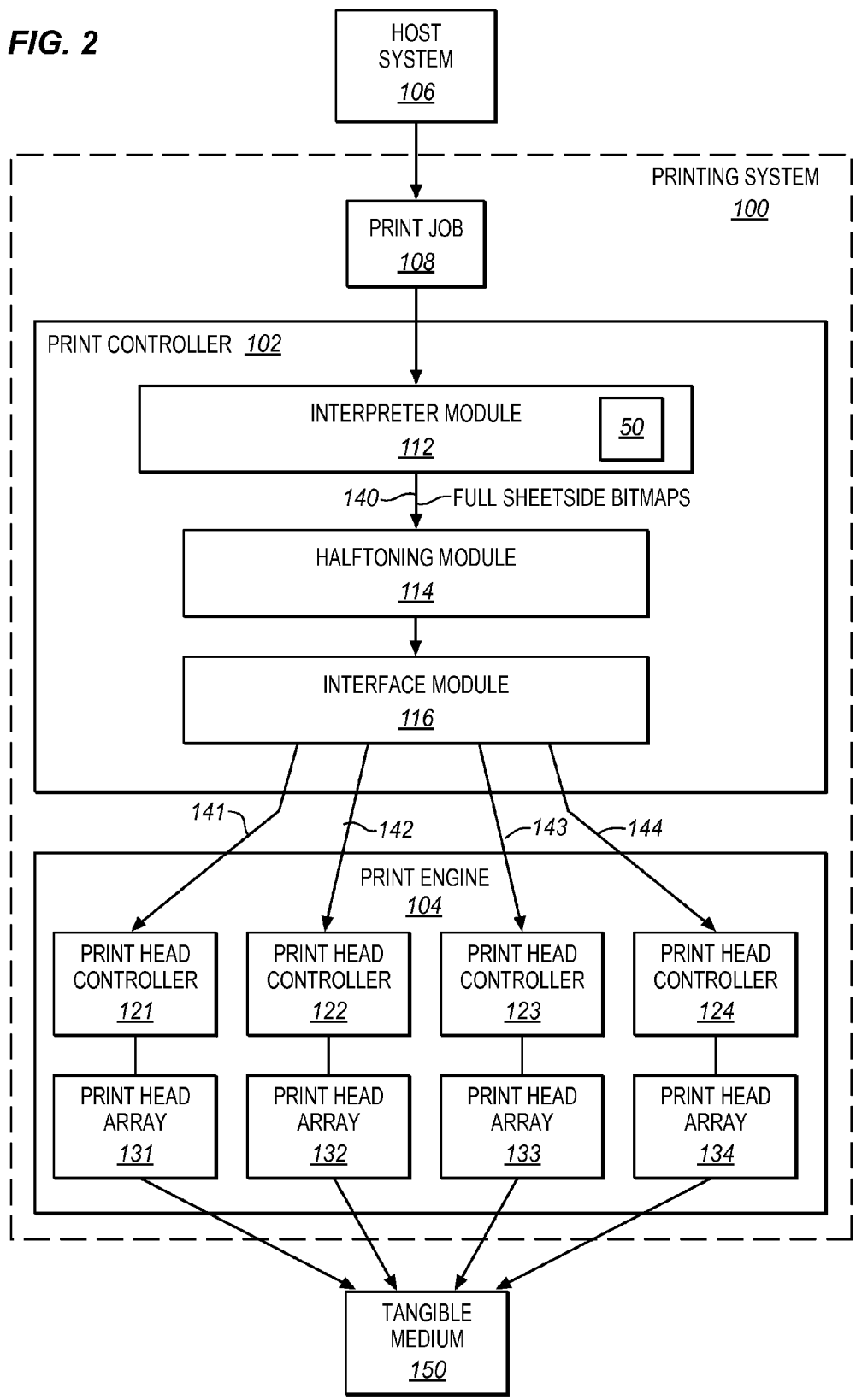
FIG. 2 is a block diagram illustrating a printing system in an exemplary embodiment.

FIG. 2 is a block diagram illustrating an exemplary printing system 100. The printing system 100 comprises any system used to provide marks on a media, such as a continuous forms printer or a cut sheet page printer. In this embodiment, the printing system 100 comprises a production printing system, which is a high-speed printer used for volume printing, such as 100 pages per minute or more. The printing system 100 includes a print controller 102 and one or more print engines 104. The print controller 102 comprises any system, server, or components operable to interface one or more host systems 106 with one or more print engines 104, and to control the printing of print jobs received from the host systems 106 on the print engines 104. The print controller 102 in this embodiment is a production print controller used for a production printing system. A production print controller is capable of concurrent page or sheetside rendering, meaning that an interpreter system in the print controller is operable to render multiple pages or sheetsides concurrently. The print engine 104 comprises any system operable to provide an imaging process to mark a printable medium, such as paper. The printing system 100 may include other components or systems not shown for the sake of brevity.

The print controller 102, in its generalized form, includes an interpreter module 112, a halftoning module 114, and an interface module 116. These separate components may represent hardware used to implement the print controller 102. One or more of the separate components may also represent logical blocks implemented in a processor executing instructions. Accordingly, the invention is not intended to be limited to any particular implementation as such may be a matter of design choice.

The interpreter module 112 comprises any system, device, or component operable to interpret, render, rasterize, or otherwise convert images (i.e., raw sheetsides) of a print job into sheetside bitmaps. The sheetside bitmaps generated by the interpreter module 112 are each a 2-dimensional array of pixels representing an image of the print job, also referred to as full sheetside bitmaps. The 2-dimensional pixel arrays are considered "full" sheetside bitmaps because the bitmaps include the entire set of pixels for the image. The interpreter module 112 is operable to interpret or render multiple raw sheetsides concurrently so that the rate of rendering substantially matches the rate of imaging of production print engines.

In this embodiment, the interpreter module 112 is also configured with the color conversion system 50 of FIG. 1. In this regard, the color conversion system 50 may receive a print job and convert the print job into a full sheetside bitmap comprised of an array of color pixels, wherein the full sheetside bitmap is destined for color conversion via an ink limitation algorithm, generally performed in the rendering process. The color conversion system 50 may then identify a portion of the print job for an additional level of color accuracy and designate that portion of the print job for color conversion via the color accuracy algorithm 54. The color conversion system 50 may then convert the color values of the identified portion of the print job using the color accuracy algorithm 54 and convert color values of the remainder of the print job using the ink limitation algorithm 53.

The halftoning module 114 is operable to represent the sheetside bitmaps as patterns of ink drops. For example, the halftoning module 114 converts the pixels to a pattern of ink drops for application to a tangible medium 150 (e.g., paper). Once computed, the halftoning module 114 transfers the converted sheetside bitmaps to the print head controllers 121-124 via the interface module 116 to apply the ink drop(s) to the tangible medium 150.

The print engine 104, in its generalized form, includes a plurality of printhead controllers 121-124 and a plurality of printhead arrays 131-134. A printhead array comprises any component having multiple nozzles, jets, or other elements that discharge ink to mark the tangible medium 150. A printhead controller 121-124 comprises any system, device, or component operable to control a printhead array. In a typical printing system, there is a one-to-one relationship between the printhead controller and the printhead array, as is illustrated in FIG. 2. Thus, one printhead controller controls one printhead array. However, in some embodiments, a printhead controller may control multiple printhead arrays. Either way, a printhead controller that controls a printhead array is referred to as being "associated" with the printhead array.

Figure 3:
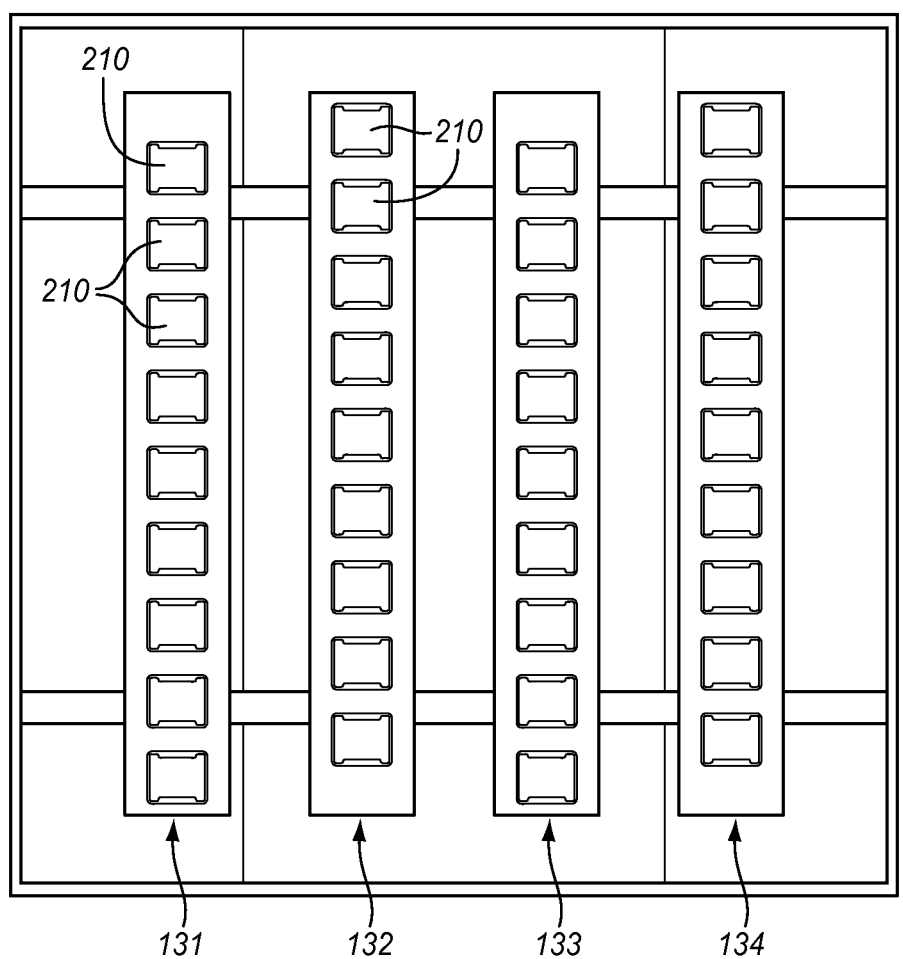
FIG. 3 illustrates printhead arrays.

FIG. 3 illustrates the printhead arrays 131-134. Each printhead array 131-134 is comprised of a plurality of printheads 210. Each individual printhead 210 includes multiple tiny nozzles (e.g., 360 nozzles per printhead depending on the resolution) that are operable to discharge ink onto the tangible medium 150 when the medium is passed underneath the printheads 210. The printhead controllers 121-124 are operable to control which nozzles discharge ink on the tangible medium 150 to print an image. In this regard, the printhead controllers 121-124 receive a full sheetside bitmap from the print controller 102. The full sheetside bitmap comprises n-bit representations of each pixel of the image. After receiving the full sheetside bitmap, each printhead controller 121-124 processes a bitmap mask to determine which of the pixels of the full sheetside bitmap are to be printed by its associated printhead array 131-134. The printhead controllers 121-124 then control their associated printhead array 131-134 to print the pixels indicated by the bitmap mask.

Figure 4:
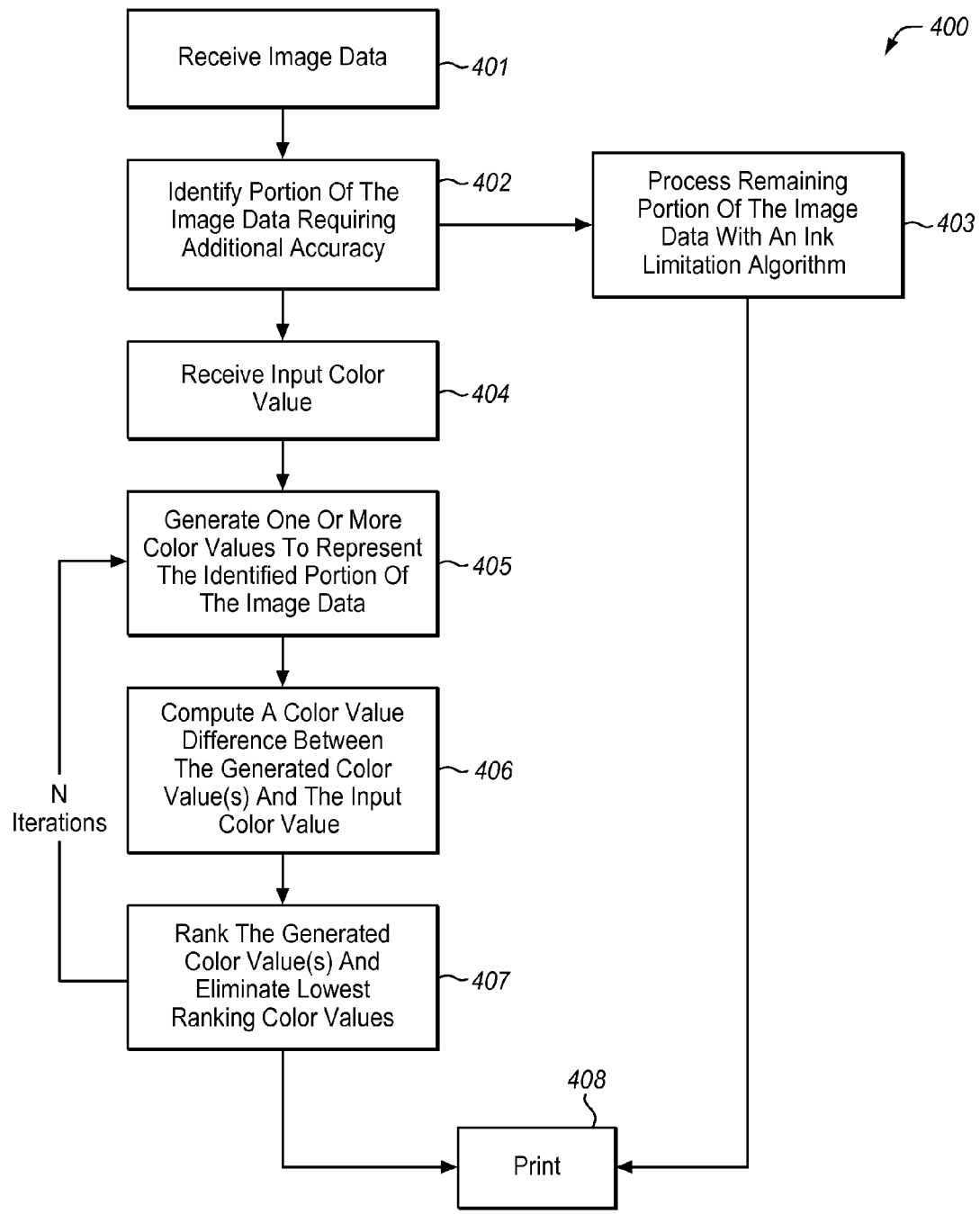
FIG. 4 is a flow chart illustrating a method of color conversion in an exemplary embodiment.

FIG. 4 is a flow chart illustrating an exemplary method 400 of color conversion. The method 400 initiates with the reception of image data by the color conversion system 50 in the process element 401. The image identification module 52 of the color conversion system 50 identifies a portion of the image data using additional color conversion accuracy in the process element 402. The processor 51 thereafter processes the remaining portion of the image data with an ink limitation algorithm 53 in the process element 403. The processor 51 may receive an input color value in the process element 404 that is used to generate one or more color values to represent the identified portion of the image data in the process element 405. For example, a user may specify the input color value in the Lab color space or some other ICC (International Color Consortium) profile, an output ICC profile and a rendering intent. The processor 51 generates a color transform based the ICC profiles and the rendering intent. In this regard, the processor 51 processes the color accuracy algorithm 54 (e.g., a genetic algorithm) to randomly generate an initial population of a pre-specified number of input color specifications.

The user may also select a color difference metric that directs the processor 51 to compute a color value difference between the generated color values and the input color value in the process element 406. The portion of the image data, once identified, may be measured in a device independent color space, such as the Lab color space. The processor 51 searches through the applied color transform for an input color specification and attempts to match the identified portion of the image data to the input color value. The search may be conducted with respect to various color metrics to establish a color difference between the Lab color specification of the input color value and its corresponding reproduction on a printer. Examples of such color metrics include DeltaE, CIE94 DeltaE, BFD Delta E, CMC Delta E, and CIE 2000 Delta E, each of which is known to those skilled in the art.

The processor 51 may rank the generated color values and eliminate the lowest ranking color values in the process element 407. For example, the input color specifications may be ranked based on their fitness values that are computed using the selected color difference metric. From there, the processor 51 may repeat the process elements 405 through 407 until a suitable color value is attained (e.g., N iterations, wherein N is an integer greater than 1). For example, the processor 51 may execute a crossover operator to generate two new input color specifications. Then, the processor 51 may execute a mutation operator over a subset of population members producing a few new input color specifications. The processor 51 evaluates each new input color specification and inserts it into the population according to its fitness value. The processor 51 then excludes those input color specifications deemed as least matching. The processor 51 repeats the crossover operator execution, the mutation operator execution, and the input color specification exclusion until a close color match is found or improvements are negligible. Once the color values of the image data have been converted (including the identified portion using additional color conversion accuracy), the image data may be sent to a printer in the process element 408 for printing to the tangible medium 150.

Although specific embodiments are described herein, the scope of the invention is not limited to those specific embodiments. The scope of the invention is defined by the following claims and any equivalents thereof. For example, the context of the detailed description often relates to color conversion of image data from an imaging device, such as a camera, for the purposes of printing in a different, typically smaller color gamut. However, the invention is not intended to be so limited. Rather, the color conversion described herein may be used to map from virtually any color gamut to another.

In the context of printing, the invention is not intended to be limited to any particular type of printer. For example, the color conversion described herein may be employed in either ink or toner based printers. Moreover, the color conversion may be employed in printers ranging in size from small household printers to large commercial printers. In one embodiment, the color conversion may be implemented as software instructions (e.g., firmware, resident software, microcode, etc.) operable to map colors between various gamuts as needed. Other embodiments of the invention can take the form of an entirely hardware embodiment, an entirely software embodiment or an embodiment containing both hardware and software elements.

Figure 5:
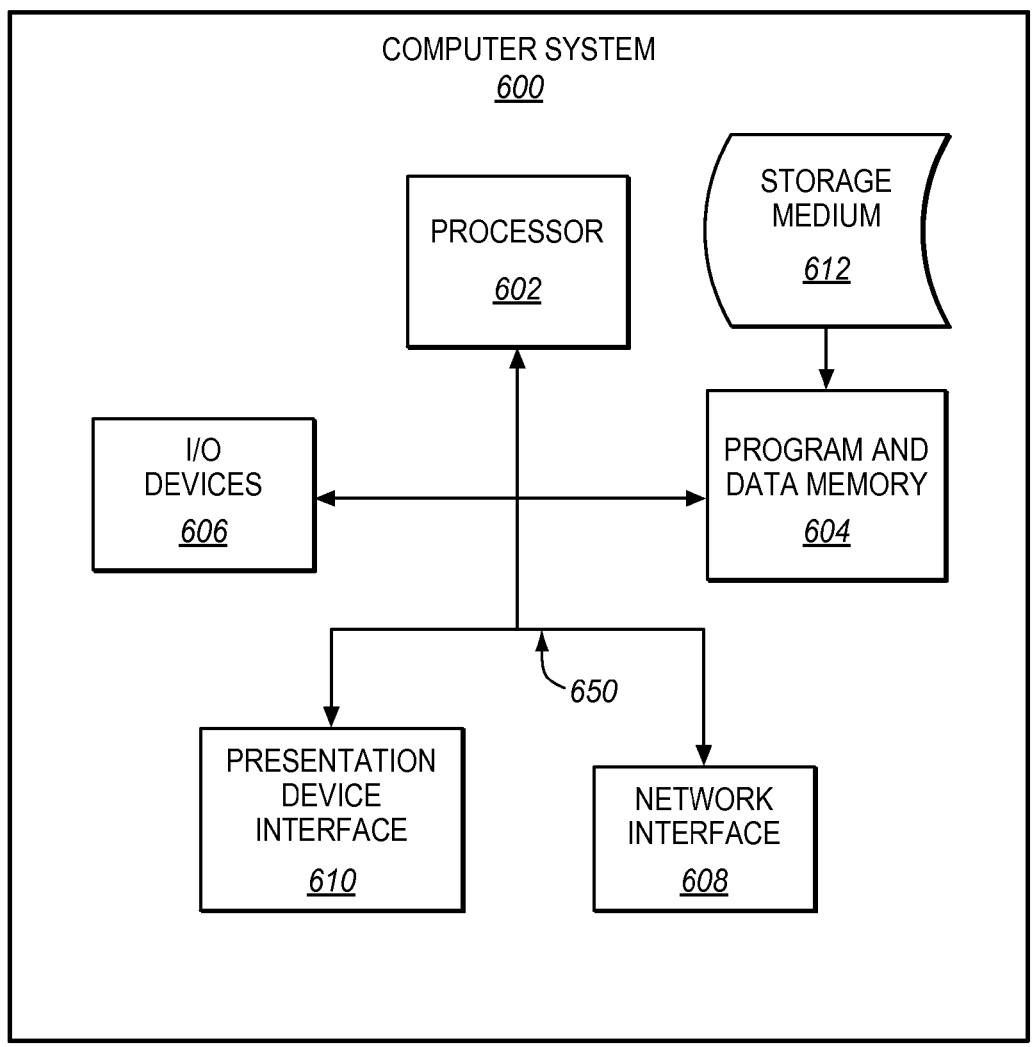
FIG. 5 illustrates a computer system operable to execute computer readable medium embodying programmed instructions to perform desired functions in an exemplary embodiment.

FIG. 5 is a block diagram depicting a computer system 600 operable to provide features and aspects hereof by executing programmed instructions and accessing data stored on a computer readable storage medium 612. Although, embodiments of the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 600 suitable for storing and/or executing program code will include at least one processor 602 coupled directly or indirectly to memory elements 604 through a system bus 650. The memory elements 604 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation device such as printing systems and displays for presentation of presentation data generated by processor 602.

I claim:

1. A printing system, comprising:
a processor operable to receive a print job and convert the print job into a full sheetside bitmap comprised of an array of color pixels, wherein the full sheetside bitmap is destined for color conversion via an ink limitation algorithm; and
an image identification module operable to identify a portion of the print job for a level of color accuracy and to designate that portion of the print job for color conversion via a color accuracy algorithm,
wherein the processor is operable to convert a color value of the identified portion of the print job using the color accuracy algorithm and to convert color values of the remainder of the print job using the ink limitation algorithm,
wherein the color accuracy algorithm is a color difference algorithm,
wherein the processor is operable to receive an input color value, to process the color difference algorithm to compute a difference between the input color value and the color value of the identified portion of the print job, and to generate alternate color values for the identified portion of the print job based on the computed difference,
wherein the input color value is a Lab color value, the color value of the print job is a CMYK color value, and the color difference algorithm is a genetic algorithm.

2. The printing system of claim 1, wherein the processor is further operable to rank the alternate color values and to remove at least one alternate color value that does not substantially match the input color value based on the rank.

3. The printing system of claim 2, wherein the processor is further operable to repeat generation of the alternate color values for the identified portion of the print job, to rank the alternate color values of the identified portion of the print job, and to remove alternate color values that do not substantially match the input color value until at least one of the alternate color values substantially matches the input color value.

4. A method of color converting image data for printing, the method comprising:
   receiving the image data;
   identifying a portion of the image data to be processed via a color accuracy algorithm;
   processing the identified portion of the image data via the color accuracy algorithm to convert a color value of the identified portion of the image data to a color gamut of the printer; and
   processing the remaining image data with an ink limitation algorithm to convert the color values of the remaining image data to the color gamut of the printer and limit ink applied to a tangible medium during printing,
   the method further comprising receiving an input color value,
   wherein processing the identified portion of the image data via the color accuracy algorithm comprises:
   processing a color difference algorithm to compute a difference between the input color value and the color value of the identified portion of the image data; and
   generating alternate color values for the identified portion of the image data based on the computed difference,
   wherein the input color value is a Lab color value, the color value of the image data is a CMYK color value, and the color difference algorithm is a genetic algorithm.

5. The method of claim 4, further comprising ranking the alternate color values and removing at least one alternate color value that does not substantially match the input color value based on the rank.

6. The method of claim 5, further comprising repeating generation of the alternate color values for the identified portion of the image data, ranking the alternate color values of the identified portion of the image data, and removing alternate color values that do not substantially match the input color value until at least one of the alternate color values substantially matches the input color value.

7. A software program recorded on a non-transitory computer readable medium used in color conversion, the software program comprising instructions that are configured to direct a processor to:
   receive image data;
   identify a portion of the image data to be processed via a color accuracy algorithm;
   process the identified portion of the image data via the color accuracy algorithm to convert a color value of the identified portion of the image data to a color gamut of the printer; and
   process the remaining image data with an ink limitation algorithm to convert the color values of the remaining image data to the color gamut of the printer and limit ink applied to a tangible medium during printing,
   the instructions being further configured to direct the processor to:
   receive an input color value;
   process a color difference algorithm to compute a difference between the input color value and the color value of the identified portion of the image data; and
   generate alternate color values for the identified portion of the image data based on the computed difference,
   wherein the input color value is a Lab color value, the color value of the image data is a CMYK color value, and the color difference algorithm is a genetic algorithm.

8. The software program of claim 7, the instructions being further configured to direct the processor to rank the alternate color values and to remove at least one alternate color value that does not substantially match the input color value based on the rank.

9. The software program of claim 8, the instructions being further configured to direct the processor to repeat generation of the alternate color values for the identified portion of the image data, to rank the alternate color values of the identified portion of the image data, and to remove alternate color values that do not substantially match the input color value until at least one of the alternate color values substantially matches the input color value.

10. A color conversion system, comprising:
   a processor operable to receive image data and to convert color values of the image data from a first color gamut to a second color gamut;
   a storage element comprising a first set of color conversion instructions operable to direct the processor to limit colors of the second color gamut during color conversion of the image data, wherein the storage element further comprises a second set of color conversion instructions operable to direct the processor to provide an additional level of color conversion accuracy during color conversion of the image data; and
   an image identification module operable to identify a portion of the image data for processing via the second set of color conversion instructions,
   wherein the processor is operable to convert a color value of the identified portion of the image data using the second set of color conversion instructions and to convert color values of the remainder of the image data using the first set of color conversion instructions,
   wherein the second set of color conversion instructions is further configured to direct the processor to:
   receive an input color value;
   process a color difference algorithm to compute a difference between the input color value and the color value of the identified portion of the image data; and
   generate alternate color values for the identified portion of the image data based on the computed difference,
   wherein the second set of color conversion instructions is further configured to direct the processor to:
   rank the alternate color values;
   remove at least one alternate color value that does not substantially match the input color value based on the rank; and
   repeat generation of the alternate color values for the identified portion of the image data, to rank the alternate color values of the identified portion of the image data, and to remove alternate color values that do not substantially match the input color value until at least one of the alternate color values substantially matches the input color value.

* * * * *